(12) United States Patent
Neubert et al.

(10) Patent No.: US 11,029,705 B2
(45) Date of Patent: Jun. 8, 2021

(54) AIRCRAFT CAPABLE OF HOVERING

(71) Applicant: Airbus Defence and Space GmbH, Taufkirchen (DE)

(72) Inventors: Nick Neubert, Hamburg (DE); Malte Blask, Hamburg (DE); Hagen Christian Hagens, Hamburg (DE)

(73) Assignee: Airbus Defence and Space GmbH

( * ) Notice: Subject to any disclaimer, the term of this patent is extended or adjusted under 35 U.S.C. 154(b) by 0 days.

(21) Appl. No.: 16/637,847

(22) PCT Filed: Jul. 27, 2018

(86) PCT No.: PCT/EP2018/070421
§ 371 (c)(1),
(2) Date: Feb. 10, 2020

(87) PCT Pub. No.: WO2019/030020
PCT Pub. Date: Feb. 14, 2019

(65) Prior Publication Data
US 2020/0272173 A1 Aug. 27, 2020

(30) Foreign Application Priority Data
Aug. 11, 2017 (DE) ...................... 10 2017 118 335.3

(51) Int. Cl.
*B64C 1/06* (2006.01)
*G05D 1/04* (2006.01)
(Continued)

(52) U.S. Cl.
CPC ............. *G05D 1/042* (2013.01); *B64C 1/061* (2013.01); *B64C 27/473* (2013.01);
(Continued)

(58) Field of Classification Search
CPC ...... G05D 1/042; B64C 1/061; B64C 27/473; B64C 39/024; B64C 2201/108; B64C 2201/162; B64C 27/00; B64C 39/02
See application file for complete search history.

(56) References Cited

U.S. PATENT DOCUMENTS 2,469,480 A 5/1949 Sikorsky
2,574,651 A 11/1951 Meyers et al.
(Continued)

FOREIGN PATENT DOCUMENTS

DE 1274449 B 8/1968
DE 29903893 U1 9/1999
(Continued)

OTHER PUBLICATIONS

International Search Report for Application No. PCT/EP2018/070421 dated Sep. 18, 2019, 2 pages.

*Primary Examiner* — Valentina Xavier
(74) *Attorney, Agent, or Firm* — Lerner, David, Littenberg, Krumholz & Mentlik, LLP

(57) ABSTRACT

An aircraft has a propulsion unit and a fuselage unit. The propulsion unit has a first rotor for providing a propulsion force on the aircraft. The fuselage unit extends along a rotation axis of the first rotor and has a rotationally symmetrical shape with respect to the rotation axis of the first rotor. The fuselage unit has a suspension at a first end by which the fuselage unit is coupled to the first rotor so that the fuselage unit is spaced apart from the first rotor along the rotation axis. A detection unit for the detection of environmental information is provided in the area of a second end of the fuselage unit. The propulsion unit is designed to keep the aircraft in a hovering flight condition so that a relative position of the aircraft with respect to a reference point on the Earth's surface remains unchanged.

13 Claims, 6 Drawing Sheets

(51) Int. Cl.
*B64C 27/473* (2006.01)
*B64C 39/02* (2006.01)

(52) U.S. Cl.
CPC ...... *B64C 39/024* (2013.01); *B64C 2201/108* (2013.01); *B64C 2201/162* (2013.01)

(56) References Cited

U.S. PATENT DOCUMENTS

| | | |
|---|---|---|
| 2,712,356 A | 7/1955 | Drago |
| 2,941,603 A | 6/1960 | Drago |
| 9,517,838 B1 | 12/2016 | Howard |
| 2003/0052222 A1* | 3/2003 | Plump .................... B64C 29/02 244/23 A |
| 2004/0124310 A1 | 7/2004 | Yamashita et al. |
| 2012/0078451 A1 | 3/2012 | Ohtomo et al. |
| 2017/0029134 A1 | 2/2017 | Lee et al. |

FOREIGN PATENT DOCUMENTS

| | | |
|---|---|---|
| DE | 10125077 A1 | 11/2002 |
| DE | 10203504 A1 | 7/2003 |
| DE | 10258545 A1 | 4/2004 |
| DE | 10256916 A1 | 9/2004 |
| DE | 10326831 A1 | 12/2004 |
| DE | 102004004480 A1 | 6/2006 |
| GB | 1523714 A | 9/1978 |
| JP | 2008120294 A | 5/2008 |
| WO | 0234620 A1 | 5/2002 |

\* cited by examiner

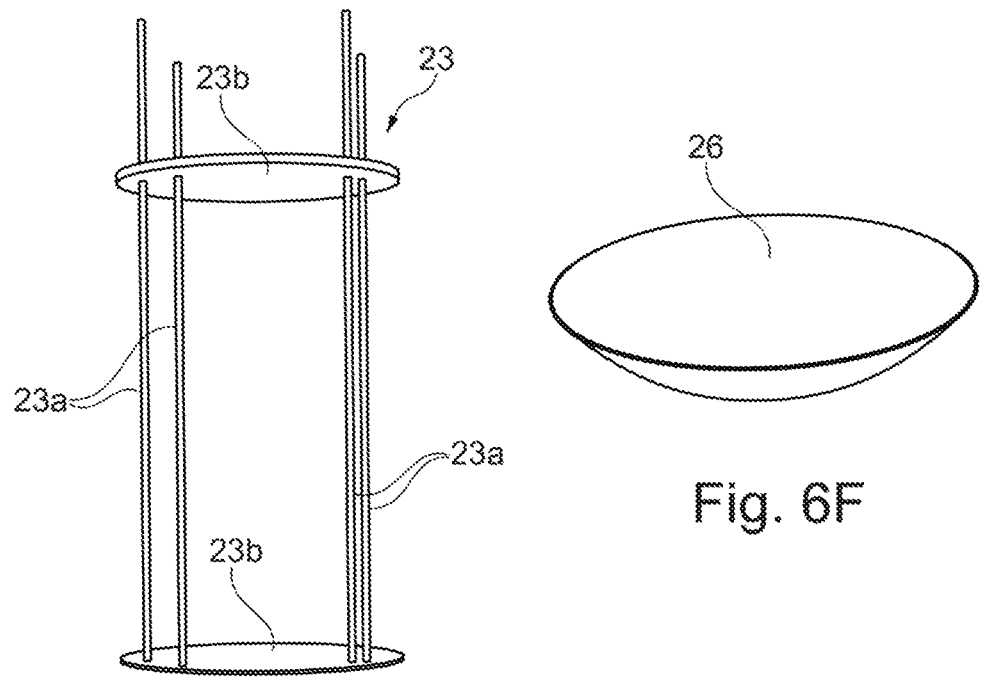
Fig. 6E
Fig. 6F
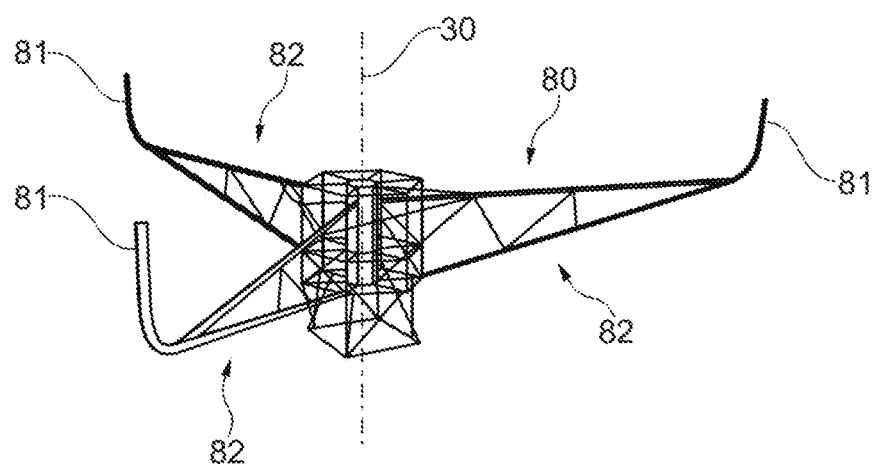
Fig. 7

AIRCRAFT CAPABLE OF HOVERING

CROSS-REFERENCE TO RELATED APPLICATIONS

The present application is a national phase entry under 35 U.S.C. § 371 of International Application Number PCT/EP2018/070421 filed Jul. 27, 2018, published in German, which claims priority from German Patent Application No. 10 2017 118 335.3 filed Aug. 11, 2017, all of which are incorporated herein by reference.

FIELD OF THE INVENTION

The present invention relates to aircraft capable of taking off vertically. In particular, the invention relates to an aircraft with hovering characteristics.

BACKGROUND OF THE INVENTION

There are already a number of different flight configurations that allow for hovering. For example, helicopters can move in a hovering flight. However, it often happens that the helicopter performs a slow relative movement with respect to the Earth's surface even at near standstill in the air. In order to prevent this relative movement, control-linked counter-movements must be performed. This consumes additional energy, which has a particular effect on the long-term flight characteristics. This has a detrimental effect not only on helicopters, but also on other manned and unmanned aircraft.

SUMMARY OF THE INVENTION

It is an object of the present invention to improve the flight characteristics of aircraft capable of hovering.

This object is achieved by the subject matter of the independent claim. Exemplary embodiments result from the dependent claims and the following description.

According to one aspect of the invention, an aircraft that is capable of hovering is specified, which has a propulsion unit and a fuselage unit. The propulsion unit has a first rotor for providing a propulsion force on the aircraft. The fuselage unit extends, for example, along a rotation axis of the first rotor and has a rotationally symmetrical shape relative to the rotation axis of the first rotor. This is especially the case when the first rotor is not tilted relative to a longitudinal axis of the fuselage unit, for example in an initial configuration. In any case, the fuselage unit can extend along the longitudinal axis of the fuselage unit, wherein the fuselage unit has a rotationally symmetrical shape relative to its longitudinal axis. The fuselage unit has a suspension at a first end, by means of which the fuselage unit is coupled to the first rotor so that the fuselage unit is spaced apart from the first rotor along the rotation axis, that is, a spatial distance is provided between the fuselage unit and the first rotor. In the area of a second end of the fuselage unit, a detection unit is provided for the acquisition of environmental information. The propulsion unit is designed to keep the aircraft in a hovering state, so that a relative position of the aircraft remains virtually unchanged with respect to a reference point on the Earth's surface.

With such an aircraft, it is possible to remain stable over a longer period of time in a hovering state in which, under ideal conditions, i.e. in the case of calm winds, no relative movement of the aircraft occurs with respect to the Earth's surface. Based on the symmetry properties of the aircraft according to the invention no counter-movements, for example by corresponding aerodynamic or drive-linked counter-controls, are required, so that the aircraft remains in place in the air. In particular, it is possible that the aircraft may remain in the hovering state for at least 12 hours, preferably for at least 24, in which the aircraft does not change a relative position with respect to the reference point on the Earth's surface. For example, the reference point is a point in a coordinate system that is fixed relative to the Earth. The hovering flight condition can be understood as a flight condition in which the relative speed of the aircraft is so low with respect to the Earth's surface that the buoyancy to overcome the weight of the aircraft is provided by the propulsion unit alone. The aircraft may be designed to carry at least 80 kg of payload. The aircraft may also be designed to carry this payload over a range of 1550 km.

The aircraft is a vertical takeoff and landing (VTOL) aircraft. Furthermore, the aircraft is very quiet in the hovering flight state and has a lower emission of pollutants than, for example, helicopters, since due to the symmetrical configuration of the aircraft according to the invention no control movements for correcting the hovering flight condition are required.

The aircraft may be an unmanned aircraft or a manned aircraft. In addition, the aircraft may be an autonomously flying aircraft or may be remotely controlled. The aircraft may in particular have a control unit by means of which the drive unit can be controlled. Furthermore, a landing gear can be controlled by the control unit, as is further specified below. The remote control of the aircraft may be carried out by means of radio frequency waves.

For example, in the event that the aircraft is autonomously controlled, a control program can be read in by the control unit before take-off, so that the aircraft is then controlled by the control unit on the basis of the read-in program. The read-in program may have data about a flight route to be flown. The aircraft may be located using GPS data.

By allowing the aircraft to fly both under remote control and autonomously, the aircraft can also be operated as a semi-autonomously controlled aircraft. Thus, the aircraft can carry out its mission autonomously using the GPS data and the given flight route without receiving further input from a ground station during the mission. In order to carry out the mission autonomously, only a data connection between the detection device and the control unit of the aircraft is required.

For example, the drive unit of the aircraft has an internal combustion engine or an electric motor. In the case of an internal combustion engine, it is powered by diesel, for example.

Preferably, the drive unit has a piston engine. The piston engine, for example, has four pistons and may be designed to drive the first rotor of the aircraft. The specific fuel consumption of the engine, for example, is a maximum of 250 g/kWh, preferably 212 g/kWh. For example, the engine has a weight of a maximum of 84 kg and has a 10 kW starter generator, which can be used as an energy source for the payload or the detection unit. The center of gravity of the engine may be on the rotation axis of the first rotor. The total diameter of the engine may be less than 650 mm, preferably 648 mm. The displacement of the piston engine may be about 2.66 l.

The engine of the drive unit may be arranged in that half of the fuselage unit which is in the area of the first end of the fuselage unit. Thus, in the initial configuration the engine is located below the first rotor but spaced apart from the rotor by the suspension. The drive unit has the first rotor and can also have a second rotor. Both the first rotor and the second rotor can be driven by the engine. There may also be one or preferably multiple tanks, which are suitable for accommodating fuel for supplying the engine with fuel. The tanks can be arranged between the first rotor and the engine, i.e. the tanks can lie above the engine when the aircraft is in a hovering state. In this way, the tanks can be positioned as close as possible to the rotor, in particular closer than any other component of the aircraft, in order to avoid too much wandering of the center of gravity while the fuel in the tanks is consumed. This is more favorable for stable hovering flight. The tanks may be located at least partially in the fuselage unit.

The propulsion unit can be used to exert a propulsion force or a buoyancy force on the aircraft. The propulsion force pulls the aircraft away from the Earth's surface, so to speak, and distances the aircraft from the Earth's surface so that the aircraft can enter a flight state. With the help of the first rotor, the aircraft can position itself above a certain reference point on the Earth's surface and can then stay above that point for a predetermined period of time. In other words, the aircraft may be designed to perform a flight motion with a relative motion with respect to the Earth's surface, but also to perform a hovering flight without a relative movement with respect to the Earth's surface. In order to move the aircraft relative to the Earth's surface, the first rotor can be tilted with respect to the longitudinal axis of the fuselage unit, so that the rotation axis of the first rotor is tilted with respect to the longitudinal axis of the fuselage unit.

The fuselage unit may have an elongated shape. For example, a longitudinal extension along the longitudinal axis of the fuselage unit is at least twice as large as a diameter of the fuselage unit. Preferably, the longitudinal extension of the fuselage unit is at least three times as large as the diameter of the fuselage unit. The fuselage unit has a rotationally symmetrical shape with respect to its longitudinal axis and/or with respect to the rotation axis of the first rotor. Preferably, the fuselage unit has an at least partially cylindrical shape, wherein the cylinder extends along the rotation axis of the first rotor and/or the longitudinal axis of the fuselage unit. The fuselage unit can thus be regarded as a kind of cylindrical box. The fuselage unit may be suitable for the accommodation and transportation of a person.

The fuselage unit has a first end facing towards the first rotor. The fuselage unit also has a second end facing away from the first rotor. For example, the fuselage unit has cladding parts or a hull, so that the fuselage unit may be a component that is closed to the environment. The cladding parts can be reversibly attached to the fuselage unit. Furthermore, the fuselage unit may have a support structure to which the cladding parts are attached. The drive unit may be at least partially clad by the cladding parts of the fuselage unit. In particular, the engine is clad by the cladding parts of the fuselage unit and the first rotor is not clad. The fuselage unit thus has cladding that protects the components arranged within the fuselage unit against external influences. Furthermore, improved aerodynamics can be provided by the cladding, in particular with regard to the air accelerated by the rotor (so-called downwash). Inside the cladding, the engine, the detection unit, the support structures and/or the tanks may be arranged. The cladding of the fuselage unit may have a sandwich construction. The panels required for this may have aramid fibers to provide protection against rock strikes. In addition to the aramid fibers, the sandwich structure can have a foam core. Repairs of damaged cladding or outer skin parts can be carried out by laminating new layers with aramid fibers.

The suspension that movably attaches the first rotor to the fuselage unit is provided in the area of the first end of the fuselage unit. The movable fastening is carried out by a swash plate mechanism, for example. The suspension may protrude from the fuselage unit to bridge the distance between the first end of the fuselage unit and the first rotor. The spacing of the first rotor from the first end of the fuselage unit along the rotation axis via the suspension can therefore be understood as a kind of hanging configuration in which the fuselage unit almost hangs on the first rotor.

The detection unit is provided in the area of the second end of the fuselage unit. The detection unit may be provided inside the cladding of the fuselage unit in order to be protected from environmental influences and to improve the aerodynamics. The detection unit is, for example, a sensor unit for detecting signals from the surroundings of the aircraft. The detection unit may be a camera for receiving optical signals or a radar unit for receiving electromagnetic signals, in particular radio waves. The camera can receive and process optical signals in the visible and/or infrared range.

According to an embodiment of the invention, a center of gravity of the aircraft is on the rotation axis of the first rotor if the aircraft is in an initial configuration in which the rotation axis of the first rotor is not tilted with respect to the longitudinal axis of the fuselage unit.

This allows a coaxial arrangement of the first rotor with the rotationally symmetrical fuselage unit to be provided, in which the hovering flight characteristics are further improved. The rotation axis of the first rotor can therefore also be a rotation axis or a longitudinal axis of the rotationally symmetrical fuselage unit in the initial configuration.

Such a symmetrical and coaxial configuration of the aircraft can avoid adverse control effects in hovering flight. In particular, a counter-control to compensate for a slight relative movement of the aircraft with regard to the Earth's surface is hardly necessary any longer. The hovering flight efficiency is further improved by the provision of a second rotor arranged coaxially to the first rotor, which rotates oppositely to the first rotor. Thus, a torque acting on the aircraft by the first rotor can be compensated, so that virtually no relative movement takes place between the reference point of the Earth's surface and the aircraft. Last but not least, this makes it possible not to require a rear boom or tail rotor and thus to save weight.

According to a further embodiment of the invention, the detection unit is designed to receive an optical signal or an electromagnetic signal. It may be provided that the detection unit is designed both for receiving an optical signal and for receiving an electromagnetic signal.

The detection unit can therefore be a camera that is designed to receive the optical signal.

Furthermore, the detection unit may be a radar unit designed to receive the electromagnetic signal. It is thus possible to use the aircraft as a mine detector, which is an advantage because the aircraft can be operated autonomously or remotely as an unmanned configuration. In this case, the detection unit is a mine detector that can use radar signals to locate mines on the Earth's surface. The Earth's surface is systematically scanned by the detection unit, so that when a mine is detected a warning signal can be issued, for example to a ground station.

In addition, the aircraft can be used as a rescue unit in emergencies, for example as a means of transport in regions that are difficult to access. It is also possible to use the aircraft as a search unit to track down missing persons in terrain that is difficult to access. For example, the use of the aircraft to track people in an earthquake zone is beneficial, as the aircraft can reach regions that are difficult to access and thus the risk of further personal injury can be avoided. The detection unit can be used to communicate wirelessly between the aircraft and a ground station to coordinate rescue workers in their operations in the earthquake zone.

In addition, the aircraft can be used as a floodlight system. For this purpose, a corresponding lighting unit may be provided on the aircraft, in particular on the fuselage unit. A high-power LED may be provided on the aircraft, for example with an output of 1 kW.

According to a further embodiment of the invention, in the hovering state the first end of the fuselage unit represents the end of the fuselage unit facing away from the Earth's surface and/or in the hovering state the second end of the fuselage unit represents the end of the fuselage unit facing towards the Earth surface.

The fuselage unit is suspended from the first rotor by means of the suspension, so to speak, so that the second end of the fuselage unit points towards the Earth's surface. Thus, the distance of the detection unit, which is provided in the area of the second end of the fuselage unit, can be chosen so that disturbing influences of the first rotor or the drive unit as a whole on the reception by the detection unit are largely prevented. In other words, the detection unit can receive signals undisturbed over a large area from the surroundings of the aircraft.

According to a further embodiment of the invention, the first rotor has at least two rotor blades, wherein the profile shape thereof remains unchanged over a length extension direction of the rotor blades.

The longitudinal extension direction of the rotor blades is, for example, the main extension direction of the two rotor blades, that is, the extension direction along which the two rotor blades extend. Each individual rotor blade has an aerodynamic profile shape that can generate buoyancy. The shape of this aerodynamic profile does not change along the longitudinal extension direction or the main extension direction. However, it is possible that the cross-sectional area changes along the longitudinal extension direction.

This configuration of rotor blades reduces noise emissions and is also a simply constructed mechanism. Due to the symmetry of the overall system, no additional tail rotor is necessary to compensate for torques or other system-inherent, undesirable movements.

The rotor blades are made of carbon fiber reinforced plastic, for example. The rotor blades may be made of carbon fiber reinforced plastic and a foam core may be produced by means of a resin injection process.

According to a further embodiment of the invention, a cross-sectional area of the profile shape of the rotor blades decreases in the longitudinal extension direction of the rotor blades starting from the rotation axis.

Thus, over the entire length of the rotor blades, an outwardly linearly increasing buoyancy or thrust can be achieved, that is it increases linearly towards the rotor blade tip. In particular, together with a certain twisting of the rotor blade profile around the longitudinal extension direction, a uniform buoyancy per unit of area of a rotor blade can be achieved.

This means that a cross-sectional profile of the rotor blade that is close to the rotation axis of the first rotor has a larger cross-sectional area than a cross-sectional profile located further away from the rotation axis, wherein the shape of the cross-sectional profiles is always the same. The cross-sectional profile of the rotor blades is thus scaled along the longitudinal extension direction.

According to a further embodiment of the invention, the two rotor blades of the first rotor are twisted around the longitudinal extension direction with increasing distance from the rotation axis of the first rotor This allows a uniform buoyancy per unit of area of a rotor blade to be achieved. In other words, a speed profile of the air that is accelerated by the rotor can be achieved, with which the speed of the accelerated air is approximately constant over the entire length of a rotor blade.

Twisting means that the angle of attack of a rotor blade changes over the longitudinal extension direction. For example, the angle of attack of the rotor blade profile decreases along the longitudinal extension direction starting from the rotation axis of the first rotor.

According to a further embodiment of the invention, the suspension for coupling the first end of the fuselage unit to the first rotor has a swash plate mechanism.

Thus, a movable attachment of the first rotor to the fuselage unit can be achieved, so that the aircraft can be controlled in its direction of movement with respect to the Earth's surface. A relative movement of the aircraft with respect to the Earth's surface can thus be enabled by the first rotor being pivoted or tilted with respect to the longitudinal axis of the fuselage unit, for example. The swash plate mechanism may have one swash plate, but preferably two swash plates. Furthermore, the swash plate mechanism may have a rotor mast. The first swash plate is mounted around the rotor mast and can be moved axially with respect to the rotor mast and tilted transversely with respect to the rotor mast. This allows cyclical inclination control of the first rotor to be provided. The swash plate mechanism of the first rotor may also have a second swash plate, which is only axially movable with respect to the rotor mast. It may therefore be provided that only a collective adjustment of the first rotor is possible.

According to a further embodiment of the invention, the aircraft has a second rotor that is arranged coaxially with respect to the first rotor. The second rotor is coupled to the fuselage unit by means of the suspension so that the fuselage unit is spaced apart from the second rotor along the rotation axis. A direction of rotation of the first rotor is opposite to a direction of rotation of the second rotor. All of the above characteristics with respect to the first rotor also apply to the second rotor.

In this case, the second rotor may be arranged between the fuselage unit and the first rotor.

By means of counter-rotating rotors, it is achieved that a torque generated by the rotation of the first rotor can be compensated by means of the second rotor and vice versa. This allows a quiet hovering flight state to be achieved, in which no control-bound counter-movements have to be carried out, whether by aerodynamic control movements or by a drive-linked control. In other words, the coaxial arrangement of both rotors and the rotationally symmetrical fuselage unit alone can provide a configuration in which balancing control movements are not required to keep the aircraft in a constant position with respect to the reference point on the Earth's surface.

According to a further embodiment of the invention, the suspension has a swash plate mechanism for coupling the first end of the fuselage unit to the second rotor.

Thus, as with the first rotor, a movable attachment of the second rotor to the fuselage unit can be achieved, so that the aircraft can be controlled in its direction of movement with respect to the Earth's surface. A relative movement of the aircraft with respect to the Earth's surface can thus be enabled by the second rotor being pivoted or tilted with respect to the longitudinal axis of the fuselage unit, for example. It may be provided that only the rotor blade, that is an axis that runs between the rotor blade base and the rotor blade tip, is tilted with respect to the longitudinal axis. This can also provide cyclical inclination control of the second rotor.

According to a further embodiment of the invention, the drive unit has an internal combustion engine, which is arranged at least partially within the fuselage unit.

The drive unit preferably has a piston engine. The drive unit may have a diesel engine. The engine can provide an output of at least 100 kW, preferably 110 kW. For example, the weight of the engine is not more than 100 kg, preferably not more than 85 kg, in particular 84 kg. The engine may be arranged within the fuselage unit, so that only the suspension for coupling the engine to the first and the second rotors is arranged partially outside the fuselage unit.

According to a further embodiment of the invention, the aircraft also has a casing unit that has an at least partially cylindrical shape that is arranged around the first rotor.

The casing unit can be circular or ring-shaped and may extend around the first rotor and around the second rotor. For example, a cross-sectional profile of the casing unit has a curved contour. The casing unit is partially cylindrical and may also have a funnel-shaped section. For example, the cylindrical portion of the casing unit is connected to an outwardly curved section, so that the impression of a funnel arises. The casing unit may be made of a fiber composite material or of a plastic. Preferably, the casing unit is made of a carbon fiber-reinforced plastic. Furthermore, the casing unit may be manufactured in a sandwich construction, wherein a carbon foam core or a foam core of another material may be provided between two thin carbon fiber reinforced plates. This allows a high flexural strength of the casing unit to be achieved. The casing unit may have an aerodynamically smooth surface.

Due to the special shape of the casing unit, reduced noise emissions and increased efficiency of the drive unit as a whole can be achieved. In addition, safety is increased as rotating rotor parts are shielded by the casing unit. The pressure decrease in the area of the funnel-shaped section, i.e. at the inlet of the casing unit, causes additional buoyancy. In particular, the casing unit has no diffuser.

According to a further embodiment of the invention, the casing unit is fixed to the fuselage unit by means of a truss structure.

A lightweight construction can be used for the truss structure. The truss structure may be made of a fiber composite material, in particular carbon fiber composite or a plastic.

Preferably, however, the truss structure is made of a metal. In particular, a light metal such as aluminum or an aluminum alloy can be considered for this purpose. However, steel may also be used. The truss structure may be attached to the support structure of the fuselage unit. The truss structure may be fixed in the half of the elongated fuselage unit in which the first end of the fuselage unit is located. Thus, a sufficient distance between the detection unit and the truss structure can be provided, so that undisturbed reception of signals can be ensured. The truss structure may have tubular elements or rod-shaped elements that are connected to each other by welded joints.

According to a further embodiment of the invention, the aircraft has a landing gear that is movably attached to the fuselage unit and that is designed to support the aircraft upon landing on the Earth's surface.

The landing gear can be retracted or folded in, for example. The landing gear may have three landing supports, wherein the three supports can each be folded in. The three supports of the landing gear may be arranged on the aircraft at an angle of 120° to each other in a plan view, so that the load is evenly distributed. The landing gear shall be designed to support the aircraft on the Earth's surface in such a way that the fuselage unit does not come into contact with the Earth's surface and that the fuselage unit or components in the fuselage unit are easy to dismantle and replace or to maintain. The supports of the landing gear can each be coupled to the truss structure by means of additional support struts to give the supports better stability.

The landing gear may have a so-called fail-safe mechanism. The landing supports have a rod-shaped design which generates low air resistance while the aircraft is flying. Furthermore, the landing gear can be folded in to improve the viewing conditions for the detection unit, especially in the event that the detection unit is a camera.

The landing gear may have a self-locking mechanism that keeps the landing supports in position in the landing state. This self-locking mechanism can be pre-tensioned by a spring, so that the landing supports are held in a deployed position. The locking mechanism can be released if the landing supports are to be folded in. The landing supports can be operated via an electrically controlled winch.

According to a further embodiment of the invention, the fuselage unit has a radome that is reversibly attached to the second end of the fuselage unit.

The radome is an antenna dome and preferably forms the end of the fuselage unit at the second end. Thus, no other components of the aircraft hinder the reception of signals from the environment. The detection unit may be arranged in the fuselage unit directly behind the radome, which thus forms a closed protective cover that protects the antennas of the detection unit for measurements (e.g. radar antennas) or for data transmissions (e.g. directional radio antennas) against external mechanical and chemical influences such as wind or rain. The radome can also be called a radar dome. The radome is permeable or transparent for signals to or from the detection unit.

BRIEF DESCRIPTION OF THE FIGURES

FIG. 6E shows a support structure according to an exemplary embodiment of the invention.

FIG. 6F shows a radome according to an exemplary embodiment of the invention.

FIG. 7 shows a truss structure according to an exemplary embodiment of the invention.

DETAILED DESCRIPTION OF EXEMPLARY EMBODIMENTS

Figure 1:
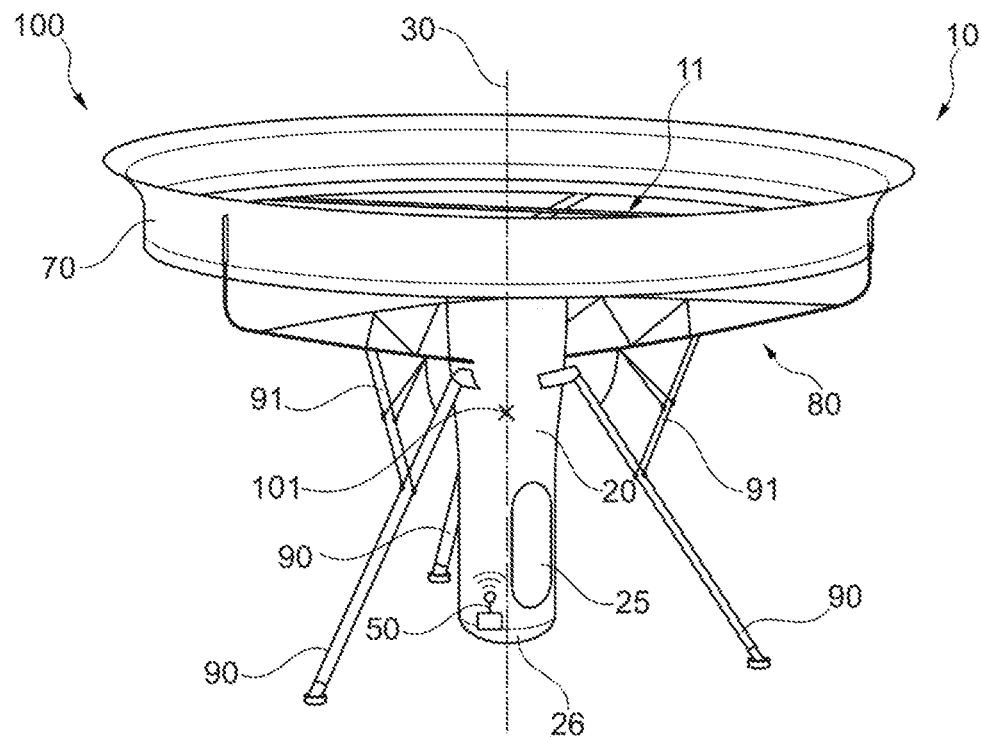
FIG. 1 shows a perspective view of an aircraft according to an exemplary embodiment of the invention.

The representations in the figures are schematic and not to scale.

If the same reference characters are used in different figures in the following description of the figures, they denote the same or similar elements. However, the same or similar elements may also be denoted by different reference characters.

FIG. 1 shows a perspective view of an aircraft 100. The aircraft 100 has a fuselage unit 20. In addition, the aircraft 100 has a propulsion unit 10 with a first rotor 11 for providing a propulsion force on the aircraft 100. The drive unit is only partially represented in FIG. 1, since only the first rotor 11 is shown, but not an also present second rotor as well as the engine of the drive unit 10. The fuselage unit 20 extends along a rotation axis 30 of the first rotor 11 and has a rotationally symmetrical shape with respect to the rotation axis 30 of the first rotor 11. The fuselage unit 20 also extends along a longitudinal axis of the fuselage unit 20, which lies on the rotation axis 30 if the first rotor 11 is not tilted. A center of gravity 101 of the entire aircraft 100 lies on the rotation axis 30 of the first rotor 11 in a hovering flight state if the rotation axis 30 is not tilted with respect to the longitudinal axis of the fuselage unit 20.

In the state shown in FIG. 1, a landing gear 90 with three landing supports is deployed, so that the aircraft 100 can be supported on the surface of the Earth by means of the landing gear 90. The landing supports of the landing gear 90 may have further support struts 91, which allow the landing supports to be retracted or folded in and which provide more stability of the entire landing gear 90 at the same time.

In the fuselage unit 20 a detection unit 50 may be provided, by means of which signals can be received, in particular optical or electromagnetic signals. To protect the detection unit, the fuselage unit 20 may also have a radome 26, which closes the fuselage unit 20 at one end.

The fuselage unit 20 has cladding that protects the components arranged within the fuselage unit 20 from external influences. The cladding is at least partially cylindrical. The fuselage unit 20 also has an access 25, through which access to the components arranged within the fuselage unit 20 can be provided. The access 25 is designed in the form of a pivotable door, the surface of which closes flush with the cladding of the fuselage unit 20. The fuselage unit 20 can be accessible to a person through the access 25.

The aircraft 100 has a casing unit 70 that is coupled to the fuselage unit 20 by means of a truss structure 80, in particular to a support structure of the fuselage unit 20 that is not shown in FIG. 1.

Figure 2:
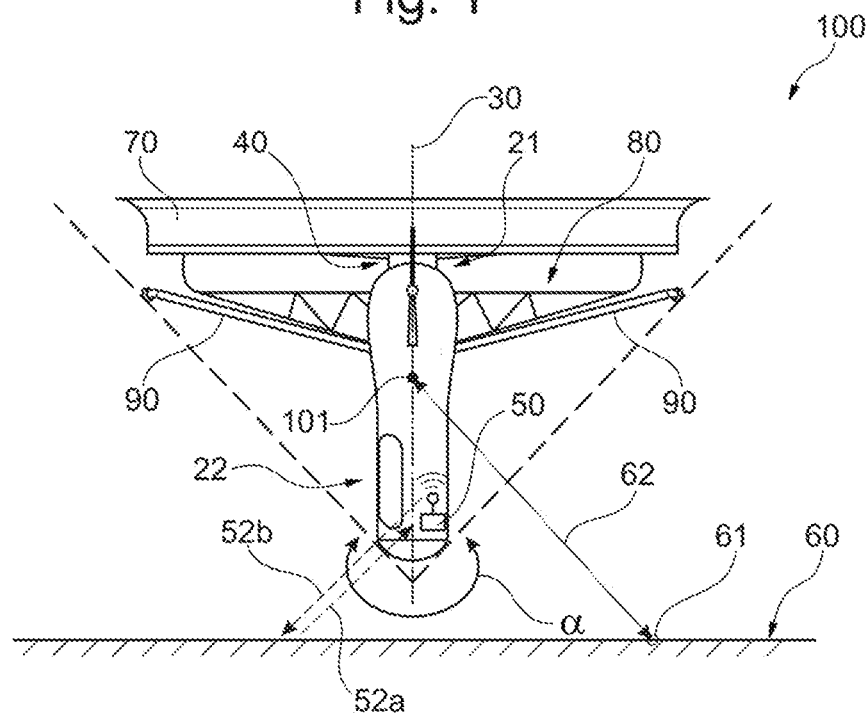
FIG. 2 shows a side view of an aircraft according to an exemplary embodiment of the invention.

As can be seen in the side view of FIG. 2, the fuselage unit 20 has a suspension 40 at a first end 21, by means of which the fuselage unit 20 is coupled to the concealed first rotor 11 and to an also concealed second rotor so that the fuselage unit 20 is spaced apart from the first rotor 11 and from the second rotor along the rotation axis 30. The detection unit 50 for the acquisition of environmental information is provided in the vicinity of a second end 22 of the fuselage unit 20.

The propulsion unit 10 is designed to keep the aircraft 100 in a hovering state, as shown in FIG. 2, so that a relative position of the aircraft with respect to a reference point 61 on the Earth's surface 60 remains unchanged. In particular, the aircraft 100 may execute the hovering flight condition in such a way that a distance 62 between the center of gravity 101 of the aircraft 100 and a reference point 61 on the Earth's surface 60 remains virtually unchanged. In ideal environmental conditions, i.e. in the case of calm winds, the relative position and orientation of the aircraft 100 in the hovering state remains unchanged with respect to the reference point 61 on the Earth's surface 60. Furthermore, in non-ideal conditions, for example in wind, standstill can be achieved by controlling by means of the rotors 11, 12, so that the relative position and the orientation of the aircraft 100 in the hovering state with respect to the reference point 61 on the Earth's surface 60 also remain unchanged.

In FIG. 2 it can also be seen that the landing gear 90 can be folded in. When folding the landing gear 90 in after take-off, the supports of the landing gear 90 are moved towards the rotors, wherein the landing supports 91 are rotated about a rotation point on the fuselage unit 20. This allows a larger free reception region for the detection unit 50 to be provided. The reception region, in which undisturbed reception of signals from the environment is possible, is limited by an opening cone, whose spatial opening angle α is at least 260° when the landing gear 90 is folded in, preferably exactly 264.6°. The detection unit 50 can receive a reception signal 52a, which is emitted from the Earth's surface 60 or from the surroundings of the aircraft, for example. However, the detection unit may also radiate a transmission signal 52b into the surroundings of the aircraft.

The casing unit 70 obscures the rotors completely in the side view of the aircraft 100 if the rotors are in a non-tilted state, as shown in FIG. 2.

In FIG. 2 it can further be seen that the truss structure 80 for fastening the casing unit 70 is fixed in the upper half of the fuselage unit 20 facing towards the first end 21.

Figure 3:
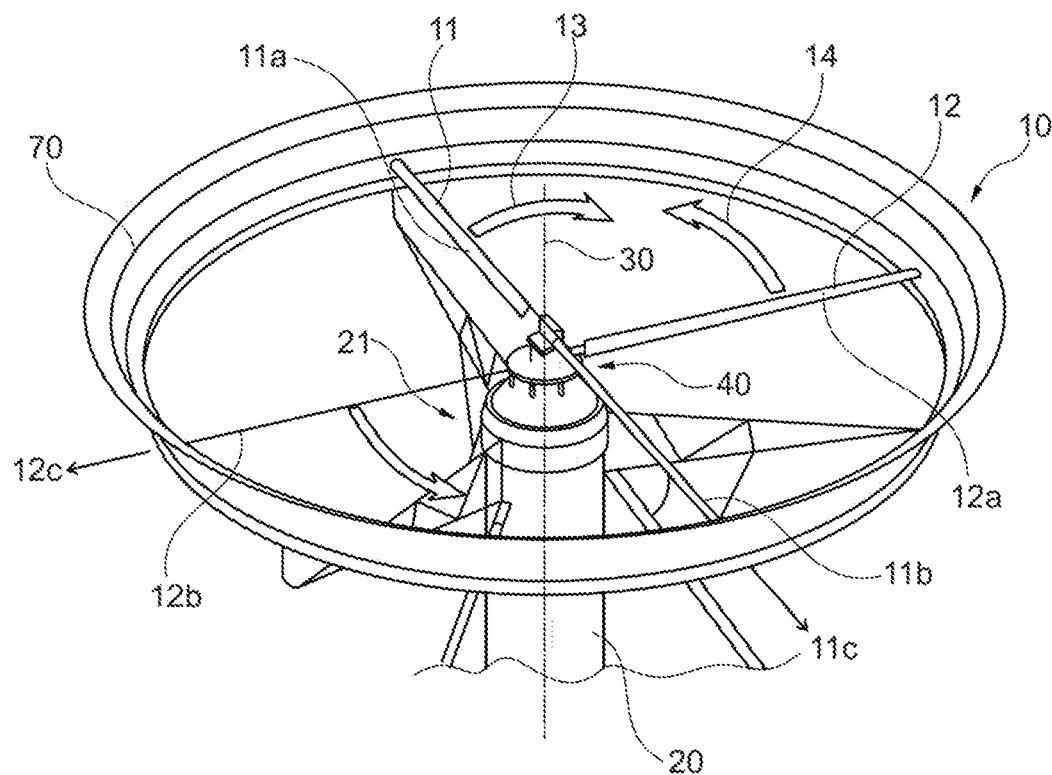
FIG. 3 shows a perspective view of two rotors according to an exemplary embodiment of the invention.

FIG. 3 shows the first rotor 11 of the drive unit 10, which has two rotor blades 11a, 11b, wherein the first rotor 11 and thus the rotor blades 11a, 11b turn in the first direction of rotation 13 marked by an arrow. Similarly, FIG. 3 shows the second rotor 12 of the drive unit 10, which has two rotor blades 12a, 12b, wherein the second rotor 12 and thus the rotor blades 12a, 12b turn in the second direction of rotation 14 marked by an arrow. The first direction of rotation 13 is opposite to the second direction of rotation 14. The first rotor 11 is arranged coaxially to the second rotor 12, that is, both rotors 11, 12 have the common rotation axis 30. The rotation axis 30 also forms the longitudinal axis or central axis of the rotationally symmetrical fuselage unit 20 if the rotors 11, 12 are not tilted.

The rotor blades 11a, 11b of the first rotor 11 are warped or twisted around a longitudinal extension direction 11c starting from the rotation axis 30. Similarly, the rotor blades 12a, 12b of the second rotor 12 are warped or twisted around a longitudinal extension direction 12c starting from the rotation axis 30. The rotors 11, 12 rotate within the casing unit 70, wherein only a small gap is provided between the ends of the rotor blades and an inner surface of the casing unit 70. Both rotors 11, 12 are coupled to the fuselage unit 20 at the first end 21 of the fuselage unit 20 by means of the suspension 40.

Figure 4:
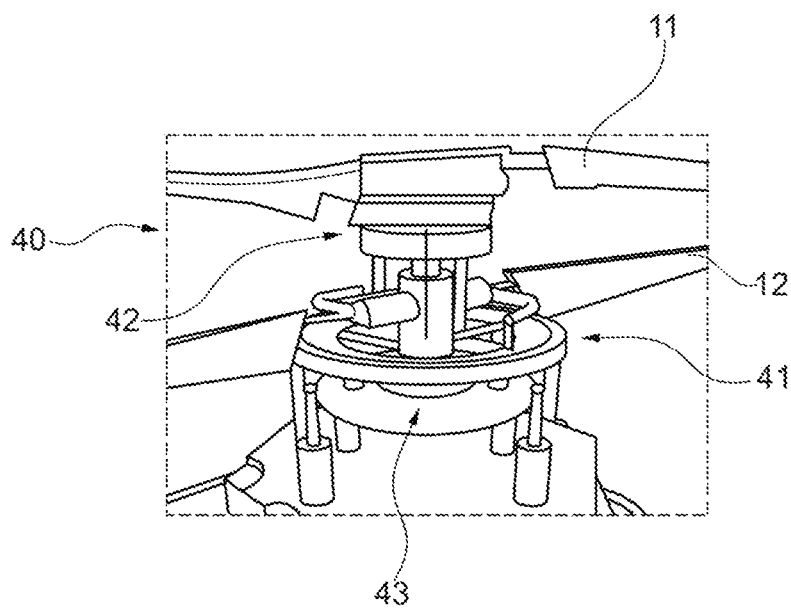
FIG. 4 shows a suspension for coupling a fuselage unit to rotors according to an exemplary embodiment of the invention.

FIG. 4 shows the suspension 40 for connecting the fuselage unit 20 to the first rotor 11 and the second rotor 12. The first rotor 11 is connected to the fuselage unit 20 by means of a swash plate mechanism with two swash plates 41, 42. Here, the second swash plate 42, to which the first rotor 11 is attached, is connected to the fuselage unit 20 by means of the first swash plate 41. Thus, the first rotor 11 can be adjusted collectively, i.e. the swash plate 42 is axially movable.

The second rotor 12 is connected to the fuselage unit 20 by means of a swash plate mechanism with one swash plate 43. By means of this swash plate mechanism, the second rotor 12 can be adjusted collectively and cyclically, whereby the swash plate 43 is axially movable and can be twisted or tilted. By means of this suspension 40, tilting of the first rotor 11 and the second rotor 12 can be provided, thus moving the aircraft 100 along a predetermined flight path relative to the surface 60 of the Earth.

Figure 5:
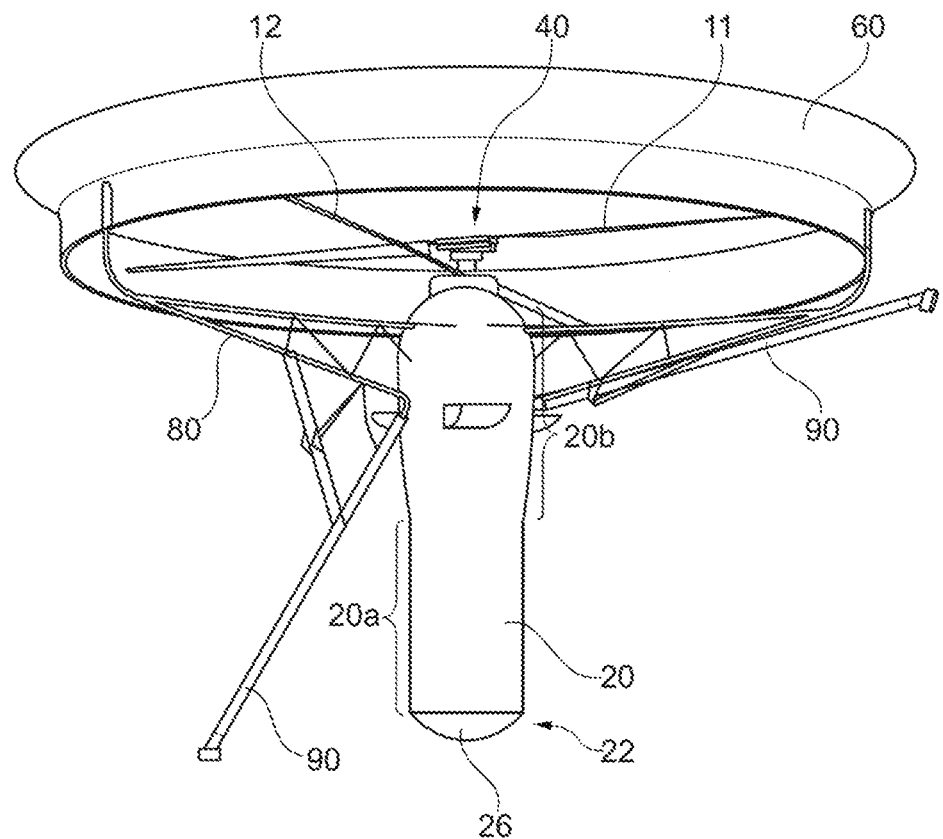
FIG. 5 shows a perspective view of an aircraft with a partially folded landing gear according to an exemplary embodiment of the invention.

FIG. 5 shows a perspective view of the aircraft 100 with a landing gear 90 that is partially folded in. A landing support of the landing gear 90 is folded in and another landing support is folded out. The radome 26 terminating the fuselage unit 20 at the second end 22 can also be recognized very clearly in FIG. 5. The fuselage unit 20 has a cylindrical section 20a. As is to be seen in FIG. 1 and in FIG. 6A, the access 25 is arranged in the cylinder-shaped section 20a. The remaining portion of the fuselage unit 20, which is arranged between the cylindrical section 20a and the suspension 40, may have a bulging shape, as can be seen in FIG. 5. In any case, both the cylindrical section 20a and thus the remaining, bulging section 20b of the fuselage unit 20 are formed rotationally symmetrically. The detection unit 50 and/or a volume for accommodating a payload can be provided in the cylindrical section 20a. The engine of the drive unit 10 and/or tanks for the fuel supply may be provided in the remaining section 20b of the fuselage unit 20.

Figures 6A, 6B, 6C, 6D:
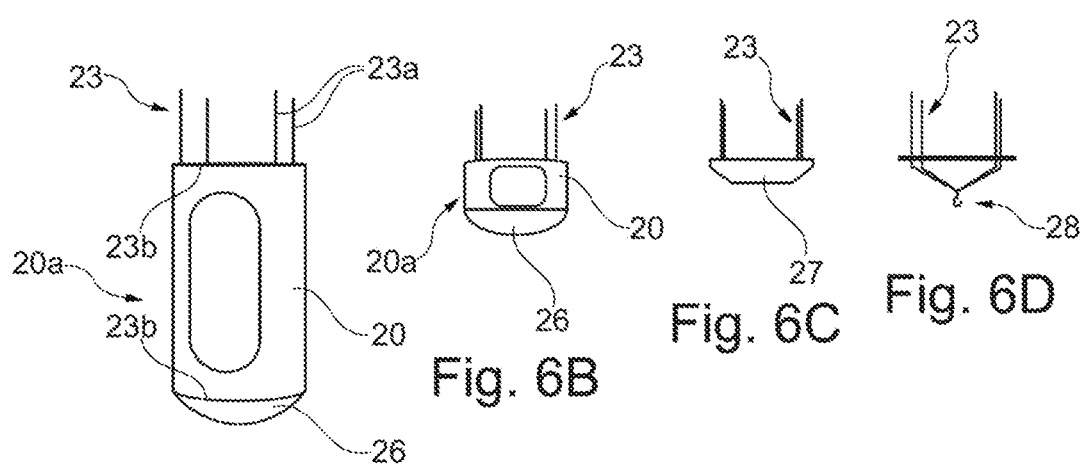
FIG. 6A shows a section of a fuselage unit according to an exemplary embodiment of the invention.
FIG. 6B shows a section of a fuselage unit according to a further exemplary embodiment of the invention.
FIG. 6C shows a section of a fuselage unit according to a further exemplary embodiment of the invention.
FIG. 6D shows a connecting element according to an exemplary embodiment of the invention.

FIG. 6A shows only the cylindrical section 20a and the support structure 23, to which the cladding of the fuselage unit 20 is attached. The support structure 23 has support struts 23a or support rods 23a. Furthermore, in FIG. 6A plate-shaped support elements 23a are to be recognized in the base. A clearer representation of the support struts 23b and the plate-shaped support elements 23b can be obtained in FIG. 6E. The cylindrical section 20a is reversibly attached to the remaining section 20b of the fuselage unit 20. Loosening or separating the cylindrical section 20a is effected by removing only four bolts or four screws. It is possible that the cylindrical section 20a has a weight of a maximum of 7 kg.

FIG. 6B shows the cylindrical section 20a as well as the support structure 23, wherein the cylindrical section 23a is significantly shortened compared to the cylindrical section 20a shown in FIG. 6A.

FIG. 6C shows a section of the fuselage unit 20 that is embodied in the form of a simple cover 27. Here, the cylindrical section is completely missing.

FIG. 6D shows a connecting element 28 that is attached to the support structure 23 instead of the cylindrical section 20a. The connecting element 28 is a hook in the case shown here, to which a part of the fuselage unit 20 or other components can be attached.

FIG. 6E shows the support structure 23. The support structure 23 has plate-shaped support elements 23b and support struts 23a, wherein the plate-shaped support elements 23b are connected by the support struts 23a. The support struts 23a and/or the plate-shaped support elements 23b can be made of carbon fiber reinforced plastic. Each of the four support struts 23a can be designed to carry at least 100 kg.

FIG. 6F shows a radome 26, which can also be called a radar dome or an antenna dome. The radome 26 can be attached directly to one of the plate-shaped support elements 23b, as shown in FIG. 6A. The radome 26 may be made of quartz fibers, allowing radar waves to pass through the radome 26. In order to be able to mount the detection unit 50 in the fuselage unit 20 easily, the radome 26 may be removably attached to the fuselage unit 20. The radome 26 has the shape of a spherical shell segment.

FIG. 7 shows the truss structure 80, which contains three fastening elements 81 for fixing the casing unit 70 that is not shown in FIG. 7 to the fuselage structure 20, which is also not shown. The truss structure 80 can have three support arms 82, which are arranged at angles of 120° to each other around the rotation axis 30 in a plan view of the truss structure 80. The fastening elements 81 are oriented substantially parallel to the rotation axis 30 at their ends. At these ends of the fastening elements 81, the truss structure 80 is attached to the casing unit 70. This fastening can, for example, be inferred from FIG. 1.

Figure 8A:
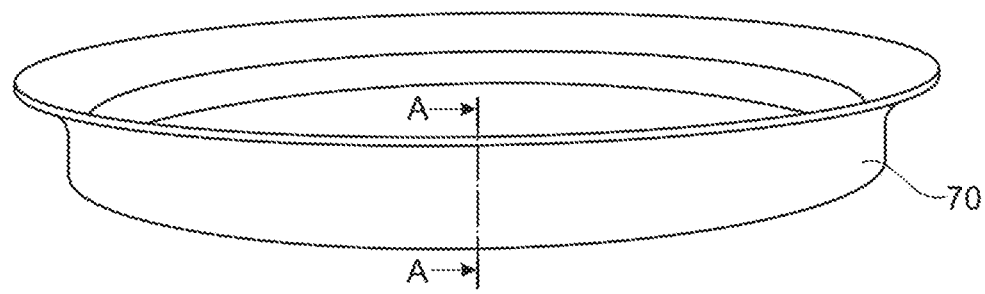
FIG. 8A shows a casing unit according to an exemplary embodiment of the invention.

FIG. 8A shows the casing unit 70, which can also be referred to as a so-called "duct". The casing unit 70 is circular or ring-shaped and is made of a fiber composite material, for example.

Figure 8B:
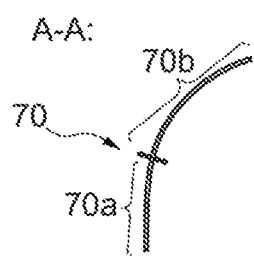
FIG. 8B shows a cross-sectional profile of a casing unit according to an exemplary embodiment of the invention.

FIG. 8B shows the cross-sectional profile of the casing unit 70 for the section A-A from FIG. 8A. The casing unit 70 has a cylindrical section 70a, which transitions into a funnel-shaped section 70b. The funnel-shaped section 70b does not form a complete quarter circle in cross-section.

Figures 9, 10:
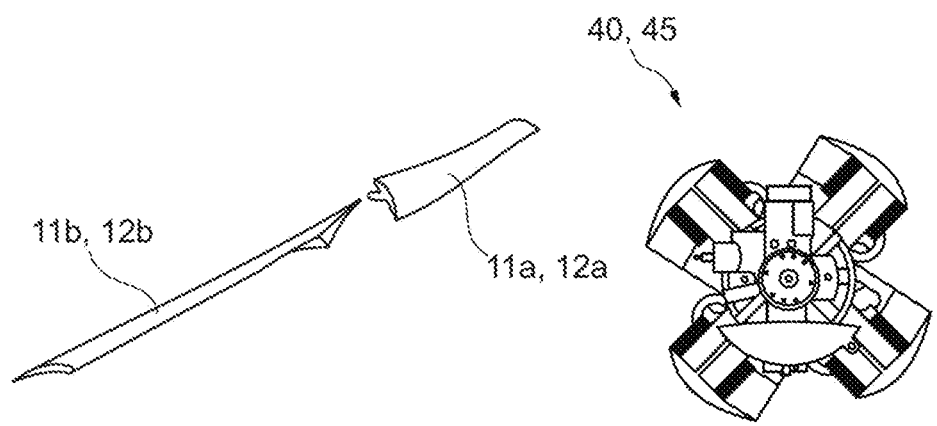
FIG. 9 shows rotor blades according to an exemplary embodiment of the invention.
FIG. 10 shows a combustion engine according to an exemplary embodiment of the invention.

FIG. 9 shows a section of rotor blades 11a, 11b or rotor blades 12a, 12b. Here it is clearly apparent that the rotor blades are warped or twisted along their longitudinal extension direction. The profile shape does not change in the longitudinal extension. Only the local angle of attack of individual segments as well as the cross-sectional area of individual segments of the rotor blade profile change in the longitudinal extension direction.

FIG. 10 shows a part of the drive unit 40, in particular the engine 45 of the drive unit 40, which can be an internal combustion engine. The internal combustion engine here is a piston engine, which is supplied with diesel as fuel. For this purpose, tanks can be arranged within the fuselage unit 20. The tanks may be arranged in such a way that the total center of gravity 101 of the aircraft 100 is on the rotation axis 30 or the longitudinal axis of the rotationally symmetrical fuselage unit 20. A total of six tanks may be provided for the aircraft, wherein all tanks may be arranged in the fuselage unit 20. A single filling nozzle can be provided for the tanks, via which all the tanks can be filled evenly. The tanks can be made of carbon fiber reinforced plastic or polyethylene. It may be provided that each tank can hold less than 50 l of fuel.

Figure 11:
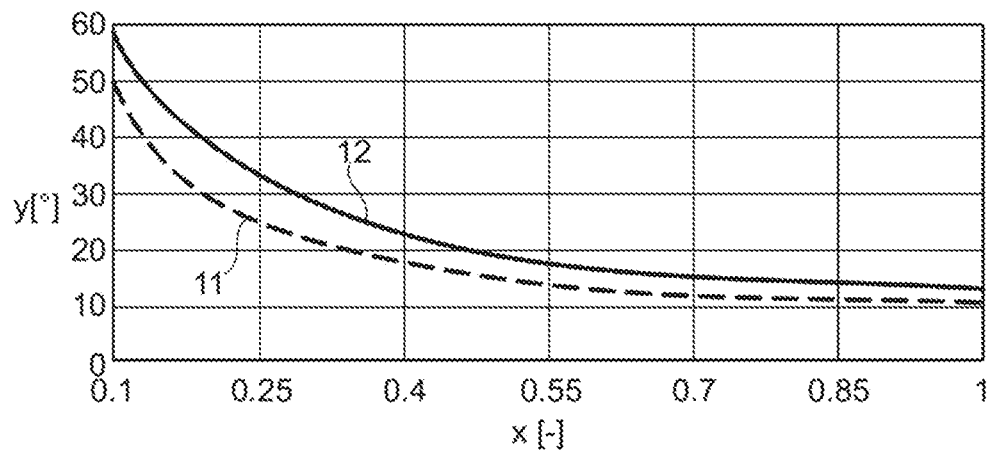
FIG. 11 shows the variation of the angle of attack of two rotor blades over their length according to an exemplary embodiment of the invention.

FIG. 11 shows the variation of the angle of attack of two rotor blades 11a, 11b or 12a, 12b plotted over the radius of the rotor 11 or 12. The angle of attack in degrees is plotted in the diagram as an ordinate (y-axis) and the radius relative to the total radius is plotted as an abscissa (x-axis). It can be seen that the rotor blades 11a, 11b of the first rotor 11 have a lower angle of attack over the entire rotor blade length than the rotor blades 12a, 12b of the second rotor 12.

Figure 12:
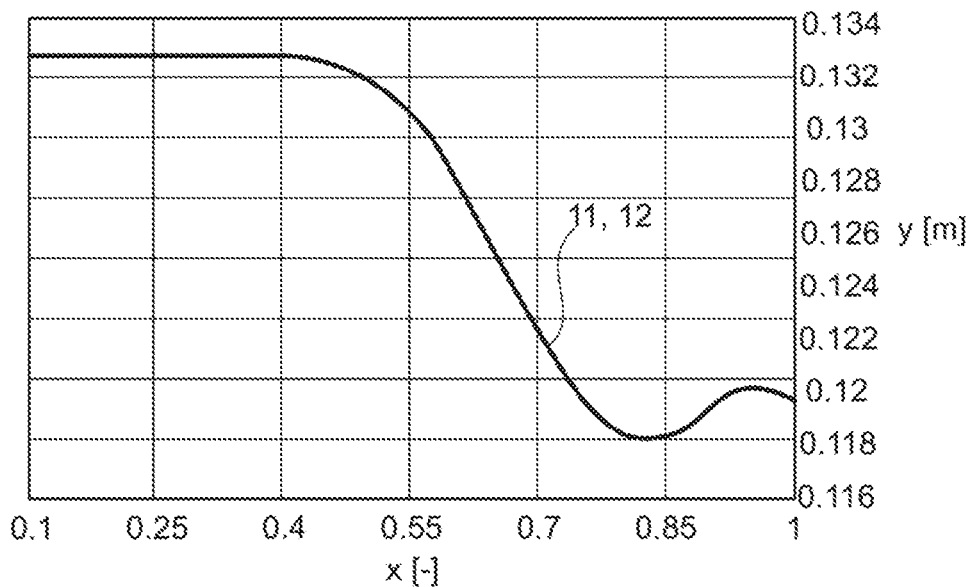
FIG. 12 shows the variation of the blade depth of two rotor blades over their length according to an exemplary embodiment of the invention.

FIG. 12 shows the variation of the rotor blade depth of two rotor blades 11a, 11b or 12a, 12b plotted over the radius of the rotor 11 or 12. The rotor blade depth in meters is plotted in the diagram as the ordinate (y-axis) and the radius relative to the total radius is plotted as the abscissa (x-axis).

In addition, it should be noted that "including" does not exclude other elements or steps and that "one" or "a" does not exclude a large number. It should also be noted that features or steps described with reference to one of the above embodiments can also be used in combination with other features or steps of other embodiments that are described above. Reference characters in the claims are not to be regarded as a restriction.

The invention claimed is:

1. An aircraft comprising:
    a propulsion unit with a first rotor for providing a propulsion force on the aircraft;
    a fuselage unit extending along a rotation axis of the first rotor and having a rotational symmetrical shape with respect to the rotation axis of the first rotor; and
    a landing gear movably attached to the fuselage unit and configured to support the aircraft upon landing on the Earth's surface, the landing gear comprising a plurality of landing supports,
    wherein the fuselage unit has a suspension at a first end by which the fuselage unit is coupled to the first rotor so that the fuselage unit is spaced apart from the first rotor along the rotation axis;
    wherein a detection unit for the detection of environmental information is provided in the area of a second end of the fuselage unit;
    wherein the propulsion unit is configured to keep the aircraft in a hovering flight condition, so that a relative position of the aircraft with respect to a reference point on the Earth's surface remains unchanged;
    wherein the first rotor has at least two rotor blades, whose profile shape remains unchanged over a longitudinal extension direction of the rotor blades, and
    wherein the plurality of landing supports is configured to fold toward the first rotor.

2. The aircraft as claimed in claim 1, wherein a center of gravity of the aircraft essentially lies on the rotation axis of the first rotor.

3. The aircraft as claimed in claim 1, wherein the detection unit is configured to receive an optical signal or an electromagnetic signal.

4. The aircraft as claimed in claim 1, wherein in the hovering flight state, the first end of the fuselage unit represents the end of the fuselage unit facing away from the Earth's surface; and
    wherein in the hovering flight state, the second end of the fuselage unit represents the end of the fuselage unit facing towards the Earth's surface.

5. The aircraft as claimed in claim 1, wherein a cross-sectional area of the profile shape of the rotor blades decreases in the longitudinal extension direction of the rotor blades starting from the rotation axis.

6. The aircraft as claimed in claim 1, wherein the two rotor blades of the first rotor are twisted around the longitudinal extension direction with increasing distance from the rotation axis of the first rotor.

7. The aircraft as claimed in claim 1, wherein the suspension for coupling the first end of the fuselage unit to the first rotor has a swash plate mechanism.

8. The aircraft as claimed claim 1, further comprising:
    a second rotor arranged coaxially to the first rotor;
    wherein the second rotor is coupled by the suspension to the fuselage unit so that the fuselage unit is spaced apart from the second rotor along the rotation axis; and
    wherein a direction of rotation of the first rotor is opposite to a direction of rotation of the second rotor.

9. The aircraft as claimed in claim 1, wherein the suspension for coupling the first end of the fuselage unit to the second rotor has a swash plate mechanism.

10. The aircraft as claimed in claim 1, wherein the propulsion unit has an internal combustion engine arranged at least partially within the fuselage unit.

11. The aircraft as claimed in claim 1, comprising:
    a casing unit having an at least partially cylindrical shape arranged around the first rotor.

12. The aircraft as claimed in claim 11, wherein the casing unit is attached to the fuselage unit by a truss structure.

13. The aircraft as claimed in claim 1,
    wherein the fuselage unit has a radome reversibly attached to the second end of the fuselage unit.

* * * * *